United States Patent
Nakahata et al.

(10) Patent No.: US 9,640,105 B2
(45) Date of Patent: May 2, 2017

(54) SIGNAL PROCESSING METHOD, DISPLAY DEVICE, AND ELECTRONIC APPARATUS

(71) Applicant: Sony Corporation, Tokyo (JP)

(72) Inventors: Yuji Nakahata, Tokyo (JP); Makoto Nakagawa, Kanagawa (JP)

(73) Assignee: Sony Corporation, Tokyo (JP)

(*) Notice: Subject to any disclaimer, the term of this patent is extended or adjusted under 35 U.S.C. 154(b) by 108 days.

(21) Appl. No.: 14/665,202

(22) Filed: Mar. 23, 2015

(65) Prior Publication Data

US 2015/0279290 A1    Oct. 1, 2015

(30) Foreign Application Priority Data

Mar. 31, 2014  (JP) ................. 2014-073792

(51) Int. Cl.
| | | |
|---|---|---|
| *G09G 3/36* | (2006.01) | |
| *G06T 1/60* | (2006.01) | |
| *G09G 3/20* | (2006.01) | |
| *G06T 1/20* | (2006.01) | |
| *G09G 5/34* | (2006.01) | |

(52) U.S. Cl.
CPC .............. *G09G 3/2092* (2013.01); *G06T 1/20* (2013.01); *G09G 5/346* (2013.01); *G09G 2320/0252* (2013.01); *G09G 2320/0271* (2013.01); *G09G 2340/02* (2013.01); *G09G 2360/12* (2013.01); *G09G 2360/18* (2013.01)

(58) Field of Classification Search
CPC .............. G06T 1/20; G09G 2320/0252; G09G 2320/0271; G09G 2340/02; G09G 2360/12; G09G 2360/18; G09G 3/2092; G09G 5/346
See application file for complete search history.

(56) References Cited

U.S. PATENT DOCUMENTS

| | | | | |
|---|---|---|---|---|
| 6,864,868 B2* | 3/2005 | Kawano | ............... | G09G 3/3648 345/87 |
| 2003/0080983 A1* | 5/2003 | Someya | ............... | G09G 3/2011 345/690 |
| 2009/0009509 A1* | 1/2009 | Tagami | ............... | G09G 3/2022 345/214 |

(Continued)

FOREIGN PATENT DOCUMENTS

| | | |
|---|---|---|
| JP | 10-039837 A | 2/1998 |
| JP | 2003-202845 A | 7/2003 |

*Primary Examiner* — Sing-Wai Wu
(74) *Attorney, Agent, or Firm* — Wolf, Greenfield & Sacks, P.C.

(57) ABSTRACT

A signal processing method includes: inputting a first image signal and a second image signal, the first image signal containing gradation levels of respective pixels of a first frame, the second image signal containing gradation levels of respective pixels of a second frame that is continuous from the first frame; storing at least one predetermined gradation level as a correction-free gradation level that needs no correction; determining whether or not the gradation level of the first frame for every pixel is the stored correction-free gradation level, based on the input first image signal; and outputting a gradation level in the input second image signal by using, as a correction-free pixel that needs no correction, a pixel for which the gradation level of the first frame is determined as the correction-free gradation level.

4 Claims, 7 Drawing Sheets

(56) References Cited

U.S. PATENT DOCUMENTS

| | | | |
|---|---|---|---|
| 2009/0091524 A1* | 4/2009 | Lomas | G09G 3/3611 345/87 |
| 2011/0090321 A1* | 4/2011 | Nakagawa | G09G 3/003 348/51 |
| 2011/0169821 A1* | 7/2011 | Ishiguchi | G09G 3/003 345/419 |
| 2013/0002618 A1* | 1/2013 | Furihata | G09G 5/363 345/204 |

* cited by examiner

FIG.4

| DESTINATION LEVEL \ START LEVEL | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | 17 | 16 | 16 | 16 | 16 | 16 | 16 | 16 | 16 | 16 | 16 | 16 | 16 | 16 | 8 | 4 | 0 |
| 32 | 74 | 55 | 32 | 32 | 32 | 32 | 32 | 32 | 32 | 32 | 32 | 32 | 32 | 32 | 24 | 18 | 7 |
| 48 | 99 | 76 | 48 | 48 | 48 | 48 | 48 | 48 | 48 | 48 | 48 | 48 | 48 | 48 | 36 | 21 | 16 |
| 64 | 116 | 86 | 64 | 64 | 64 | 64 | 64 | 64 | 64 | 64 | 64 | 64 | 64 | 64 | 52 | 40 | 26 |
| 80 | 123 | 98 | 81 | 80 | 80 | 80 | 80 | 80 | 80 | 80 | 80 | 80 | 80 | 80 | 75 | 75 | 50 |
| 96 | 133 | 109 | 97 | 96 | 96 | 96 | 96 | 96 | 96 | 96 | 96 | 96 | 96 | 96 | 96 | 90 | 81 |
| 112 | 144 | 124 | 116 | 112 | 112 | 112 | 112 | 112 | 112 | 112 | 112 | 112 | 112 | 112 | 110 | 108 | 105 |
| 128 | 157 | 141 | 137 | 128 | 128 | 128 | 128 | 128 | 128 | 128 | 128 | 128 | 128 | 128 | 128 | 124 | 124 |
| 144 | 167 | 160 | 152 | 144 | 144 | 144 | 144 | 144 | 144 | 144 | 144 | 144 | 144 | 144 | 144 | 144 | 140 |
| 160 | 182 | 175 | 174 | 160 | 160 | 160 | 160 | 160 | 160 | 160 | 160 | 160 | 160 | 160 | 160 | 157 | 156 |
| 176 | 196 | 191 | 189 | 176 | 176 | 176 | 176 | 176 | 176 | 176 | 176 | 176 | 176 | 176 | 176 | 176 | 173 |
| 192 | 207 | 204 | 201 | 192 | 192 | 192 | 192 | 192 | 192 | 192 | 192 | 192 | 192 | 192 | 192 | 192 | 189 |
| 208 | 226 | 217 | 216 | 208 | 208 | 208 | 208 | 208 | 208 | 208 | 208 | 208 | 208 | 208 | 208 | 208 | 208 |
| 224 | 244 | 238 | 232 | 224 | 224 | 224 | 224 | 224 | 224 | 224 | 224 | 224 | 224 | 224 | 224 | 224 | 224 |
| 240 | 253 | 250 | 246 | 240 | 240 | 240 | 240 | 240 | 240 | 240 | 240 | 240 | 240 | 240 | 240 | 240 | 240 |
| 255 | 255 | 255 | 255 | 255 | 255 | 255 | 255 | 255 | 255 | 255 | 255 | 255 | 255 | 255 | 255 | 255 | 255 |

Gradation level that needs overdrive (upper-right region)

Gradation level that needs no overdrive (diagonal region)

Gradation level that needs overdrive (lower-left region)

| | | | | | | | | | | | | | | | | | | |
|---|---|---|---|---|---|---|---|---|---|---|---|---|---|---|---|---|---|---|
| | | | | | | | | | START LEVEL | | | | | | | | | |
| | | 0 | 16 | 32 | 48 | 64 | 80 | 96 | 112 | 128 | 144 | 160 | 176 | 192 | 208 | 224 | 240 | 255 |
| | 0 | 0 | 0 | 0 | 0 | 0 | 0 | 0 | 0 | 0 | 0 | 0 | 0 | 0 | 0 | 0 | 0 | 0 |
| | 16 | 17 | 16 | 16 | 16 | 16 | 16 | 16 | 16 | 16 | 16 | 16 | 16 | 16 | 16 | 16 | 16 | 16 |
| | 32 | 74 | 55 | 32 | 32 | 32 | 32 | 32 | 32 | 32 | 32 | 32 | 32 | 32 | 32 | 32 | 32 | 32 |
| | 48 | 99 | 76 | 48 | 48 | 48 | 48 | 48 | 48 | 48 | 48 | 48 | 48 | 48 | 48 | 48 | 48 | 48 |
| | 64 | 116 | 86 | 64 | 65 | 64 | 64 | 64 | 64 | 64 | 64 | 64 | 64 | 64 | 64 | 64 | 64 | 64 |
| | 80 | 123 | 98 | 81 | 81 | 80 | 80 | 80 | 80 | 80 | 80 | 80 | 80 | 80 | 80 | 80 | 80 | 80 |
| | 96 | 133 | 109 | 97 | 96 | 97 | 96 | 96 | 96 | 96 | 96 | 96 | 96 | 96 | 96 | 96 | 96 | 96 |
| | 112 | 144 | 124 | 116 | 115 | 115 | 113 | 112 | 112 | 112 | 112 | 112 | 112 | 112 | 112 | 112 | 112 | 112 |
| | 128 | 157 | 141 | 137 | 137 | 135 | 129 | 129 | 128 | 128 | 128 | 128 | 128 | 128 | 128 | 128 | 128 | 128 |
| | 144 | 167 | 160 | 157 | 154 | 152 | 148 | 145 | 144 | 144 | 144 | 144 | 144 | 144 | 144 | 144 | 144 | 144 |
| | 160 | 182 | 175 | 174 | 171 | 167 | 165 | 164 | 162 | 161 | 161 | 161 | 161 | 161 | 161 | 161 | 161 | 161 |
| | 176 | 196 | 191 | 189 | 186 | 182 | 181 | 180 | 179 | 178 | 176 | 176 | 176 | 176 | 176 | 176 | 176 | 176 |
| | 192 | 207 | 204 | 201 | 199 | 198 | 197 | 196 | 195 | 194 | 192 | 192 | 192 | 192 | 192 | 192 | 192 | 192 |
| | 208 | 226 | 217 | 216 | 214 | 213 | 212 | 211 | 211 | 210 | 208 | 208 | 208 | 208 | 208 | 208 | 208 | 208 |
| | 224 | 244 | 238 | 232 | 230 | 229 | 229 | 228 | 228 | 227 | 224 | 224 | 224 | 224 | 224 | 224 | 224 | 224 |
| | 240 | 253 | 250 | 246 | 245 | 244 | 243 | 243 | 242 | 242 | 240 | 240 | 240 | 240 | 240 | 240 | 240 | 240 |
| | 255 | 255 | 255 | 255 | 255 | 255 | 255 | 255 | 255 | 255 | 255 | 255 | 255 | 255 | 255 | 255 | 255 | 255 |

DESTINATION LEVEL (left axis)

Gradation level that needs overdrive / Gradation level that needs no overdrive

FIG.5

SIGNAL PROCESSING METHOD, DISPLAY DEVICE, AND ELECTRONIC APPARATUS

CROSS REFERENCE TO RELATED APPLICATIONS

This application claims the benefit of Japanese Priority Patent Application JP 2014-073792 filed Mar. 31, 2014, the entire contents of which are incorporated herein by reference.

BACKGROUND

The present technology relates to a signal processing method, a display device, and an electronic apparatus.

In the past, a liquid crystal display device including a liquid crystal panel has been known as one of display devices. For example, Japanese Patent Application Laid-open No. 2003-202845 discloses a technique on a liquid crystal driving circuit used for a liquid crystal display device. In the liquid crystal driving circuit, correction data for correcting gradation values of the current image is generated based on a first decoded image corresponding to the current image and a second decoded image corresponding to an image, which is one frame precedent to the current image. Using the correction data, the response speed of liquid crystal can be accurately controlled, so that even a moving image that changes at a high speed is appropriately displayed (see Japanese Patent Application Laid-open No. 2003-202845, paragraphs [0002], [0050], [0053], [0059], etc.).

Additionally, Japanese Patent Application Laid-open No. Hei 10-39837 discloses as shown in FIGS. 1 and 2 thereof a liquid crystal display device including a display panel 12, a liquid crystal driving circuit 11, a frame memory 5, and a video signal converting unit 7. Based on a video signal 2 sequentially input and a video signal 4 output from the frame memory 5, a frame of the video signal 4 being one frame precedent to the current frame, a liquid crystal driving signal 6 is output from the video signal converting unit 7. This can prevent image deterioration due to a residual image, which is caused by a long response time of liquid crystal (see Japanese Patent Application Laid-open No. Hei 10-39837, paragraphs [0009], [0016], [0017], etc.).

SUMMARY

There is a demand for various techniques for displaying images with high image quality, as described in Japanese Patent Application Laid-open Nos. 2003-202845 and Hei 10-39837.

In view of the circumstances as described above, there is a need for providing a signal processing method, a display device, and an electronic apparatus that are capable of displaying images with high image quality.

According to an embodiment of the present technology, there is provided a signal processing method including: inputting a first image signal and a second image signal, the first image signal containing gradation levels of respective pixels of a first frame, the second image signal containing gradation levels of respective pixels of a second frame that is continuous from the first frame; storing at least one predetermined gradation level as a correction-free gradation level that needs no correction; determining whether or not the gradation level of the first frame for every pixel is the stored correction-free gradation level, based on the input first image signal; and outputting a gradation level in the input second image signal by using, as a correction-free pixel that needs no correction, a pixel for which the gradation level of the first frame is determined as the correction-free gradation level.

In this signal processing method, the correction-free gradation level is stored, and a pixel that satisfies a result of the determination described above is set as a pixel that needs no adjustment. This can suppress the occurrence of a problem caused by correcting all pixels across the board. Consequently, a high-quality image can be displayed.

The signal processing method may further include: coding and storing the input first image signal; and decoding the coded and stored first image signal. In this case, the determining may be performed based on the decoded first image signal.

Using this signal processing method can allow the suppression of the influence of deterioration in image signal involved in coding and decoding.

The signal processing method may further include storing a flag corresponding to a determination result on each pixel by the determining. In this case, the outputting may be performed based on the stored flag on each pixel.

This can improve the image quality.

The signal processing method may further include: generating a substitutive image signal by substituting the gradation level determined as the correction-free gradation level in the gradation levels of the pixels in the first image signal, with a substitutive gradation level that is a predetermined gradation level corresponding to the correction-free gradation level; coding and storing the generated substitutive image signal; and decoding the coded and stored substitutive image signal. In this case, the outputting may be performed using a pixel having the substitutive gradation level as the correction-free pixel, based on the decoded substitutive image signal.

This allows the substitutive gradation level to be used as a flag. Further, this allows the deterioration involved in coding and decoding to be suppressed. Consequently, a high-quality image can be displayed.

The substitutive gradation level may be one of the largest gradation level and the smallest gradation level in the gradation levels each corresponding to the correction-free gradation level.

According to another embodiment of the present technology, there is provided a signal processing method including: inputting a first gradation signal and a second gradation signal, the first gradation signal indicating a gradation level of a predetermined pixel of a first frame, the second gradation signal indicating a gradation level of the predetermined pixel of a second frame that is continuous from the first frame; and setting the input second gradation signal as a correction target, when the input first gradation signal belongs to one of a high gradation level and a low gradation level, and excluding the input second gradation signal from the correction target, when the input first gradation signal belongs to a gradation level between the high gradation level and the low gradation level.

This can suppress the occurrence of a problem caused by correcting all pixels across the board. Consequently, a high-quality image can be displayed.

The setting may include excluding the input second gradation signal from the correction target, when the input first gradation signal belongs to a middle gradation level.

According to another embodiment of the present technology, there is provided a display device including an input unit, a storage unit, a determination unit, and an output unit.

The input unit is configured to input a first image signal and a second image signal, the first image signal containing gradation levels of respective pixels of a first frame, the second image signal containing gradation levels of respective pixels of a second frame that is continuous from the first frame.

The storage unit is configured to store at least one predetermined gradation level as a correction-free gradation level that needs no correction.

The determination unit is configured to determine whether or not the gradation level of the first frame for every pixel is the stored correction-free gradation level, based on the input first image signal.

The output unit is configured to output a gradation level in the input second image signal by using, as a correction-free pixel that needs no correction, a pixel for which the gradation level of the first frame is determined as the correction-free gradation level.

According to another embodiment of the present technology, there is provided an electronic apparatus including the display device described above.

As described above, according to the present technology, it is possible to display images with high image quality. It should be noted that the effects described herein are not necessarily limited and any one of the effects described herein may be produced.

These and other objects, features and advantages of the present technology will become more apparent in light of the following detailed description of best mode embodiments thereof, as illustrated in the accompanying drawings.

BRIEF DESCRIPTION OF DRAWINGS

FIG. 4 is a diagram showing an example of a LUT (lookup table) used in a correction step;

FIG. 5 is a diagram showing another example of the LUT used in the correction step;

DETAILED DESCRIPTION OF EMBODIMENTS

Hereinafter, an embodiment of the present technology will be described with reference to the drawings.

(Configuration of Display Device)

Figure 1:
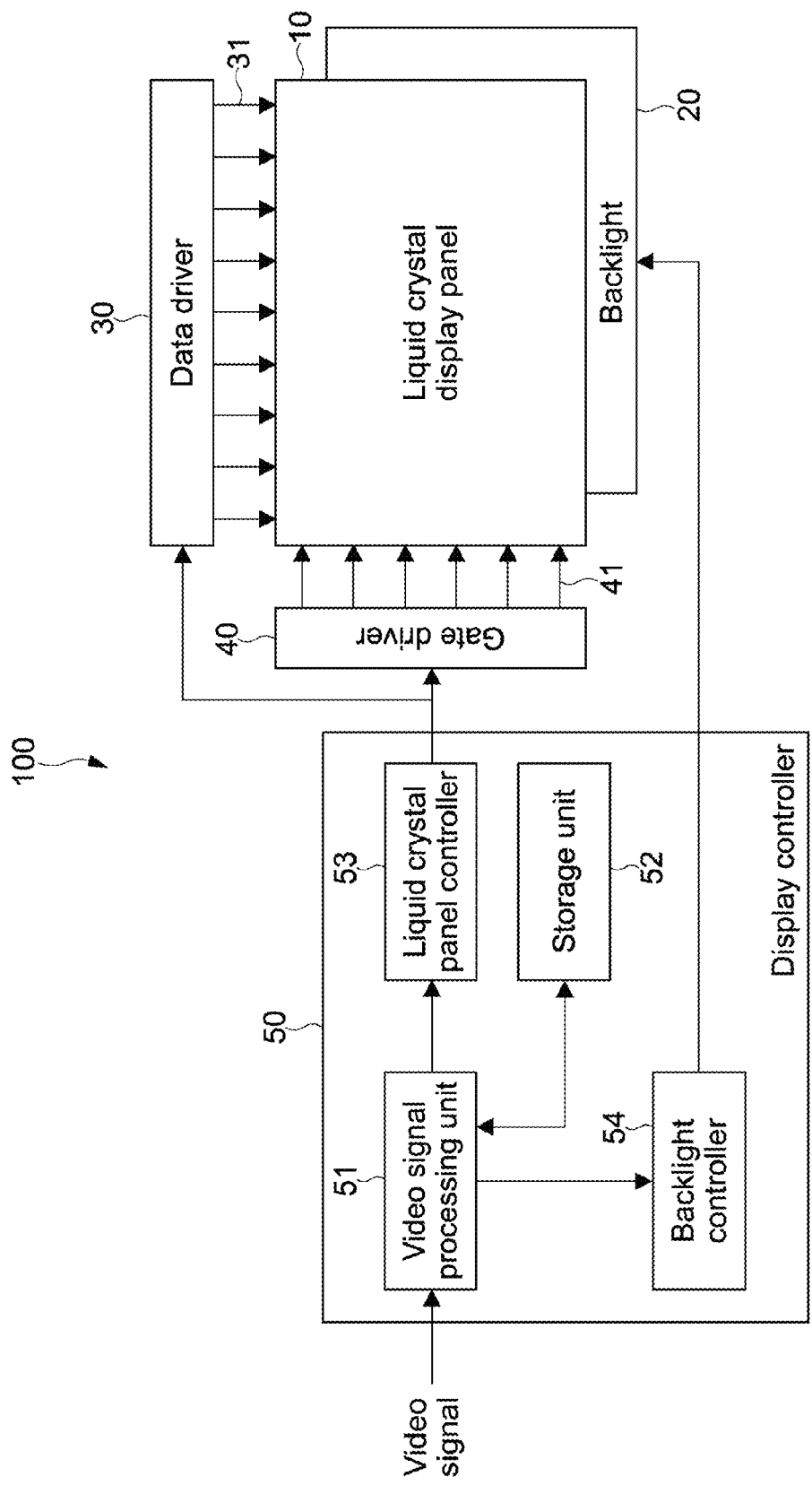
FIG. 1 is a schematic diagram showing a configuration example of a display device according to an embodiment of the present technology.

FIG. 1 is a schematic diagram showing a configuration example of a display device according to an embodiment of the present technology. A display device 100 of FIG. 1 includes a liquid crystal display panel 10, a backlight 20, a data driver 30, a gate driver 40, and a display controller 50.

The liquid crystal display panel 10 is an active-matrix liquid crystal display panel, for example, buy may be another-type liquid crystal display panel. The liquid crystal display panel 10 includes a plurality of display elements arranged in a matrix (not shown). The plurality of display elements that show, for example, RGB colors are used.

The plurality of display elements correspond to pixels of images to be displayed. In the case where one pixel serving as a unit to form a color image, i.e., unit pixel, is formed of a plurality of sub-pixels, those sub-pixels correspond to the plurality of display elements.

Specifically, the plurality of display elements each include a TFT (thin-film transistor), a pixel electrode, a common electrode, a liquid crystal layer, and a Cs electrode. The TFT and the electrodes are disposed on substrates that sandwich the liquid crystal layer. The source of the TFT is connected to a data bus line 31 shown in FIG. 1, the gate thereof to a gate bus line 41, and the drain thereof to the pixel electrode.

The liquid crystal layer is disposed between the pixel electrode and the common electrode. With a data drive voltage and a gate drive voltage supplied from the data driver 30 and the gate driver 40, respectively, to the pixel electrode and the common electrode, a voltage (hereinafter, also referred to as response voltage) is generated therebetween. This response voltage changes the orientation of the liquid crystal layer.

The Cs electrode serves to hold the charge of the pixel electrode. The gradation (luminance) of each display element is controlled by an absolute value of the response voltage. In other words, as the absolute value of the response voltage becomes larger, the gradation becomes larger.

Even if the response voltage reaches a target voltage, it takes time for the luminance of each display element to reach a desired value. This is because it takes time to change the orientation of a liquid crystal image corresponding to the response voltage. The time taken to reach a target luminance, that is, a response time, depends on the characteristics of the liquid crystal display panel 10, the temperature of the display element (specifically, the temperature of the liquid crystal layer), and the like.

The backlight 20 illuminates the liquid crystal display panel 10 from the back side. The data driver 30 supplies a drive voltage, that is, a data drive voltage, to the display elements 11 via the data bus line 31. The gate driver 40 supplies a drive voltage, that is, a gate drive voltage, to the display elements 11 via the gate bus line 41.

The display controller 50 is achieved by various hardware configurations, for example, a CPU (Central Processing Unit), a ROM (Read Only Memory), a RAM (Random Access Memory), and the like. Specifically, the ROM stores programs for achieving functional blocks of the display controller 50, and the CPU reads and executes the programs. In such a manner, the functional blocks of the display controller 50 are achieved.

As shown in FIG. 1, the display controller 50 includes a video signal processing unit 51, a storage unit 52, a liquid crystal panel controller 53, and a backlight controller 54.

The video signal processing unit 51 can execute predetermined processing on a video signal that is input from the outside and the like. The predetermined processing includes a gamma correction, an overdrive correction, and the like. For example, as digital video signals, a plurality of image signals corresponding to a plurality of consecutive frames are input to the video signal processing unit 51. Each of the image signals is a signal containing information on a gradation level of each pixel of the frame and contains a gradation signal that indicates information on a gradation level of each pixel of the frame. The gradation signal is a signal that is input to correspond to each pixel. Analog video signals may also be input to the video signal processing unit 51 from the outside. In this case, the video signal processing unit 51 samples the video signals as appropriate to generate image signals for respective frames.

The video signal processing unit 51 generates a displayed frame signal that contains information on a light emission gradation level of each pixel of a frame to be displayed. For example, gradation levels in an input image signal are corrected as appropriate, and a displayed frame signal is generated. The displayed frame signal is output to the liquid crystal panel controller 53 and the backlight controller 54. It should be noted that the correction on the gradation levels means the correction on gradation signals.

Based on the displayed frame signal, the liquid crystal panel controller 53 generates a data drive voltage and a gate drive voltage that correspond to the light emission gradation level. The data drive voltage and the gate drive voltage are supplied to the display elements via the data driver 30 and the gate driver 40, respectively. The backlight controller 54 controls the drive of the backlight 20 based on the displayed frame signal.

In this embodiment, the video signal processing unit 51 executes a signal processing method according to an embodiment of the present technology. In other words, based on the gradation levels in the image signal of the frame that is precedent to the current frame, whether each of the pixels is to be gradation-corrected or needs no correction is determined. Typically, an overdrive correction is executed as the gradation correction, but the gradation correction is not limited thereto.

The storage unit 52 is, for example, a ROM, an HDD (Hard Disk Drive), or the like, and functions as a frame memory. The storage unit 52 stores a LUT (lookup table) used in the gradation correction that will be described later.

Additionally, the storage unit 52 stores one or more predetermined gradation levels, which need no correction and are each referred to as correction-free gradation level. For example, it is assumed that 8-bit gradation in the range of gradation levels 0 to 255 is used as gradation. Of those gradation levels, one or more predetermined gradation levels, that is, a certain gradation level such as gradation level 100 or 120, or gradation levels in a certain range of gradation levels 100 to 120 are stored as correction-free gradation levels. It should be noted that 10-bit gradation in the range of gradation levels 0 to 1023 may be used as gradation, for example.

(Video Signal Processing Unit and Signal Processing Method)

Figure 2:
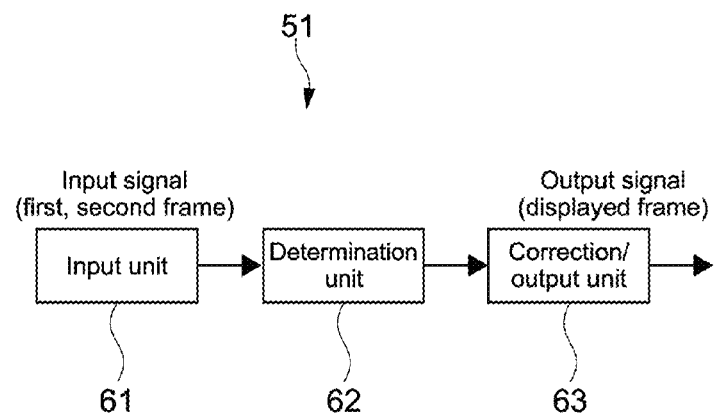
FIG. 2 is a schematic diagram showing a configuration example of a video signal processing unit.

FIG. 2 is a schematic diagram showing a configuration example of the video signal processing unit 51 according to this embodiment. The video signal processing unit 51 includes an input unit 61, a determination unit 62, and a correction/output unit 63.

The input unit 61 inputs image signals of a plurality of consecutive frames. In particular, image signals of two consecutive frames of the plurality of frames are input, and the signal processing method according to the embodiment of the present technology is executed. Hereinafter, the image signals of the two consecutive frames are referred to as a first image signal of a first frame and a second image signal of a second frame. The second frame follows the first frame. Additionally, the image signals of the two consecutive frames may also be referred to as a first image signal of an n−1 frame and a second image signal of an n frame.

Based on the input first image signal, the determination unit 62 determines whether a gradation level of the first frame for every pixel is a stored correction-free gradation level or not. In other words, the determination unit 62 determines whether the gradation level of a precedent frame, which is displayed forward out of the two consecutive frames, is a correction-free gradation level or not.

Regarding a pixel for which the gradation level of the first frame is not determined as a correction-free gradation level, the correction/output unit 63 sets this pixel as a pixel to be gradation-corrected, and corrects the gradation level of the second frame based on the stored LUT. In this embodiment, an overdrive correction is executed as the gradation correction, but other correction processing may be executed.

Further, regarding a pixel for which the gradation level of the first frame is determined as a correction-free gradation level, the correction/output unit 63 sets this pixel as a correction-free pixel that needs no correction, and then outputs the gradation level in the input second image signal without change. In such a manner, when the second frame is a frame to be displayed, the overdrive correction is performed on the pixels to be corrected, whereas the input signals are output without change for the correction-free pixels.

Hereinafter, the signal processing method according to some embodiments of the present technology will be described.

(Signal Processing Method 1)

Figure 3:
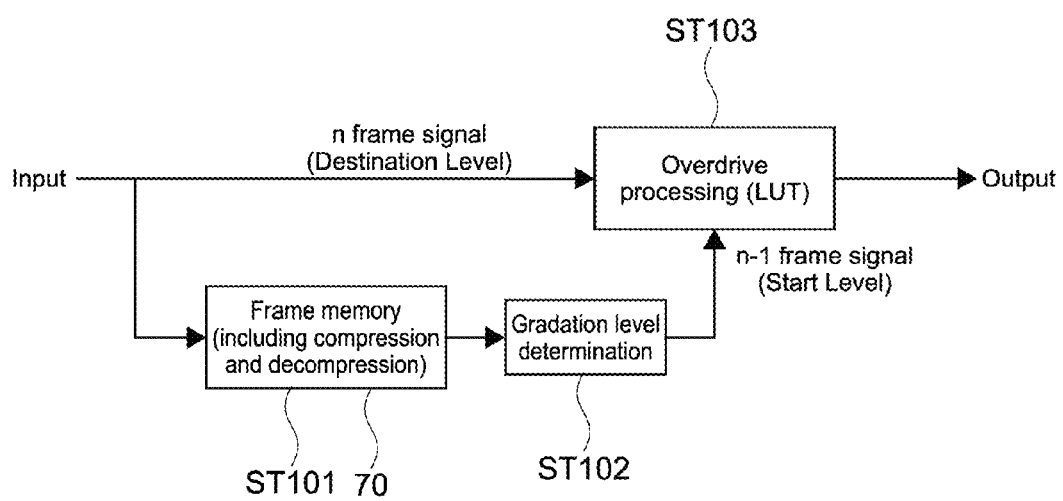
FIG. 3 is a flowchart showing a correction example by a signal processing method according to the embodiment of the present technology.

FIG. 3 is a flowchart showing a correction example by a signal processing method 1. A first image signal of an n−1 frame is compressed by coding and stored in the frame memory 70. The coding for use may be any coding including block coding such as GBTC (Generalized Block Truncation Coding), two-dimensional discrete cosine transform coding such as JPEG (Joint Photographic Experts Group), and the like. The first image signal coded and stored is decoded as appropriate for use (Step 101). Such data compression can lead to a reduction in memory size.

Based on the decoded first image signal, the determination unit 62 determines whether a gradation level of the first frame for every pixel is a correction-free gradation level or not (Step 102). The correction/output unit 63 executes the overdrive correction using the LUT (Step 103).

FIG. 4 is a diagram showing an example of the LUT used in a correction step. In FIG. 4, "START LEVEL" indicates the gradation levels of the first frame in the pixels, and "DESTINATION LEVEL" indicates the gradation levels of the second frame in the pixels.

In this correction example, it is assumed that the gradation levels in the range of 33 to 223 are stored as correction-free gradation levels. So, in the LUT, in the range of 0 to 32 and the range of 224 to 255 of the first frame, with the gradation levels of the input first and second frames being as arguments, the corrected gradation levels of the second frame are stored as correction values.

On the other hand, regarding the correction-free gradation levels in the range of 33 to 223, correction values are not stored. For easy understanding, FIG. 4 schematically shows a LUT in which the range of the correction-free gradation levels is hatched.

For gradation levels not stored in the LUT, correction values are output by linear interpolation or the like. As a matter of course, correction values may be stored for all the gradation levels. Additionally, values equal to gradation levels of the input second frame may be stored as correction values. In other words, a gradation level having the same value as the gradation level input for a pixel to be corrected may be output.

The correction/output unit 63 does not execute the overdrive correction for pixels having the gradation levels of the first frame that fall within the range of gradation levels 33 to 223, and outputs the gradation levels of the input second frame without change. Meanwhile, the correction/output unit 63 executes the overdrive correction for pixels having gradation levels of the first frame that fall out of the above range of gradation levels, with reference to the LUT.

In general, in liquid crystal displays, overdriving is performed, in which a precedent frame and a current frame are compared in terms of signal level and a signal level higher or lower than the signal level of the current frame is output, in order to compensate for the slow response speed of liquid crystal. For the overdriving, it is necessary to store the precedent frame in the frame memory and compare it with the current frame. This leads to a problem of an increase in cost due to the frame memory.

As measures against the increase in cost, a technique of coding and compressing image information to be stored in the frame memory is used in some cases. In the case where the overdrive correction is performed with reference to a compressed image, however, there arises a problem of the deterioration in image quality due to the loss of the image information by compression, e.g., a problem of a reduced sharpness when a high-definition image is slowly scrolled.

In recent years, along with the improvement of liquid crystal materials and orientation techniques, in a transition from a predetermined range of gradation levels, a response speed close to a desired one has been achieved without applying overdrive. In this regard, for gradation levels in which a response speed close to a desired one is achieved without applying overdrive, overdrive is not applied. This can prevents image deterioration.

Based on the above ideas by the inventors, the signal processing method according to the embodiment of the present technology is devised. In other words, regarding pixels having the gradation levels of the first frame that correspond to the correction-free gradation levels, the overdrive correction is not performed thereon, and the gradation levels of the input second frame are output without change. This can suppress the influence of determination in image signals involved in coding and decoding of images, as compared to a case where all the pixels are subjected to the overdrive correction across the board, for example.

In the case where variations in gradation of the first frame are caused by coding and decoding, for example, overdrive is applied based on the gradation of the first frame having the variations and on the gradation of the second frame. In this case, when the second frame is displayed, light-emitting elements may emit light in a light emission gradation that is different from a desired light emission gradation. The occurrence of such a case leads to the deterioration in image quality of the second frame.

In this signal processing method, pixels having the gradation levels of the first frame that correspond to the correction-free gradation levels are excluded from the target of the overdrive correction. So, the deterioration in image quality can be satisfactorily suppressed as compared with the case where all the pixels are targets of the overdrive correction across the board.

FIG. 5 is a diagram showing another example of the LUT used in the correction step. The LUT is used in the case where the gradation levels in the range of 113 to 255 are set as correction-free gradation levels. In such a manner, the gradation levels used as correction-free gradation levels may be set as appropriate.

The gradation range of a precedent frame, which is not subjected to the overdrive correction and is output as the gradation levels of the current frame without change, is determined mainly based on a response speed of liquid crystal. So, the correction-free gradation level is determined based on the temperature of the panel, a drive frequency, and the like. For example, in the case of a high temperature or a low drive frequency, the range of the correction-free gradation levels becomes wide, and in the case of a low temperature or a high drive frequency, the range becomes narrow.

In addition, the correction-free gradation level may be set as appropriate based on devises, circuit configurations, and the like of a display device to be manufactured. Similarly, correction values in the gradation range in which the overdrive correction is executed may be set as appropriate. When display devices are designed and manufactured, typically, the LUTs shown in FIGS. 4, 5, and the like are created in each series. Though not limited thereto, a LUT and the like may be created as appropriate at every shipping time of products from factories.

Additionally, the correction-free gradation level may be variable based on the temperature of the panel, a drive frequency, and the like. In other words, the correction-free gradation level may be determined as appropriate in accordance with conditions and a LUT corresponding thereto may be created as appropriate. Alternatively, a plurality of setting patterns of the correction-free gradation levels and LUTs corresponding thereto may be stored and an adequate setting pattern and LUT may be selected in accordance with conditions and the like. Further, a user may execute a setting or change of the correction-free gradation levels. In this case, a LUT corresponding to the correction-free gradation level set or changed by the user is created as appropriate.

(Signal Processing Method 2)

Figure 6:
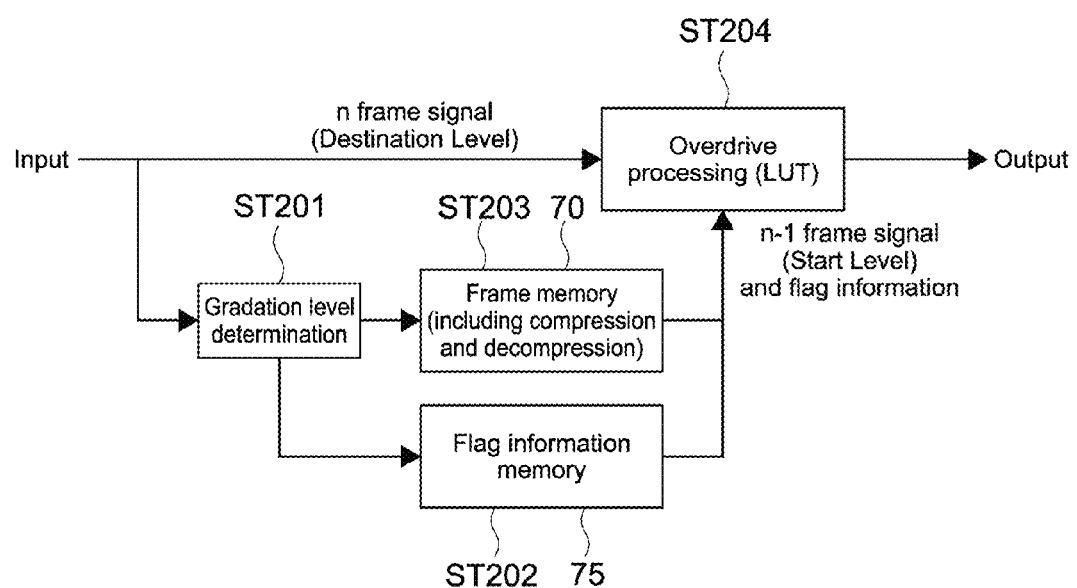
FIG. 6 is a flowchart showing another correction example by the signal processing method according to the embodiment of the present technology.

FIG. 6 is a flowchart showing a correction example by a signal processing method 2. A determination by the determination unit 62 is made on the first image signal of the n−1 frame (Step 201). Flags corresponding to determination results of respective pixels are calculated and stored in a flag information memory 75 (Step 202). For example, regarding a pixel for which the gradation level of the first frame is determined as a correction-free gradation level, "1 (on)" is set as a flag. On the other hand, regarding a pixel for which the gradation level of the first frame is not determined as a correction-free gradation level, "0 (off)" is set as a flag.

The first image signal of the n−1 frame is compressed by coding and stored in the frame memory 70 (Step 203).

The correction/output unit 63 executes output based on the stored flags on the respective pixels. In other words, the overdrive correction is not executed for the pixels having the flags of "on", and the gradation levels in the input second image signal are output without change. For the pixels having the flags of "off", correction values derived from the gradation levels of the first frame and the gradation levels of the second frame are output based on the LUT (Step 204).

In the case where variations in gradation level of the first frame are caused by coding and decoding, for example, the following case may occur: the gradation level of the first frame is considered as a correction-free gradation level or conversely do not apply to a correction-free pixel level. In this case, a normally unnecessary overdrive correction is executed or a necessary overdrive correction is not executed.

In this signal processing method, prior to the coding on the first frame, the determination by the determination unit 62 is executed, and flag information corresponding to the determination results are stored. Even in the case where variations due to the coding and decoding are caused, the correction-free pixel and the pixel to be corrected can be correctly determined based on the flag information. As a result, the high-quality second frame can be displayed. It should be noted that spatial compression processing may be executed for the flag information in the range in which the influence on the image quality is permissible.

(Signal Processing Method 3)

Figure 7:
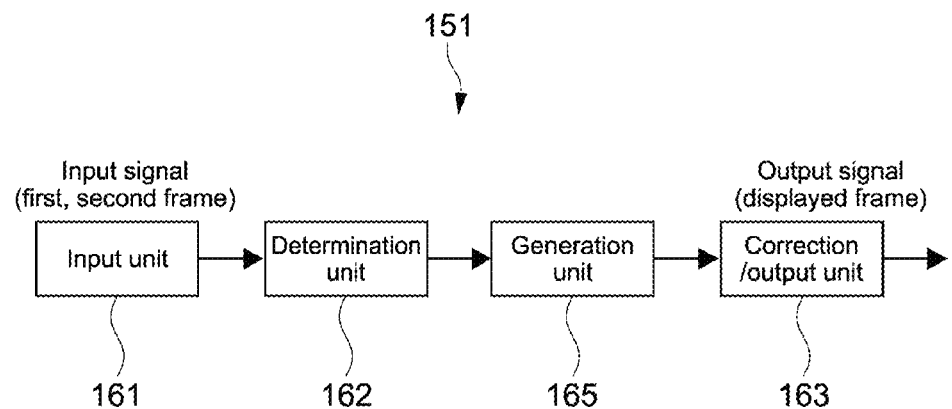
FIG. 7 is a schematic diagram showing another configuration example of a video signal processing unit.

FIG. 7 is a configuration example of a video signal processing unit 151 that executes a signal processing method 3 according to the embodiment of the present technology. It should be noted that in the following description, parts that are the same as configurations and actions in the video signal processing unit 51 shown in FIG. 2 are not described or simply described.

The video signal processing unit 151 includes a generation unit 165. The generation unit 165 substitutes a gradation level, which is determined as a correction-free gradation level in the gradation levels of respective pixels in the first image signal, with a substitutive one that is a predetermined gradation level corresponding to a correction-free gradation level, to generate a substitutive image signal.

Figure 8:
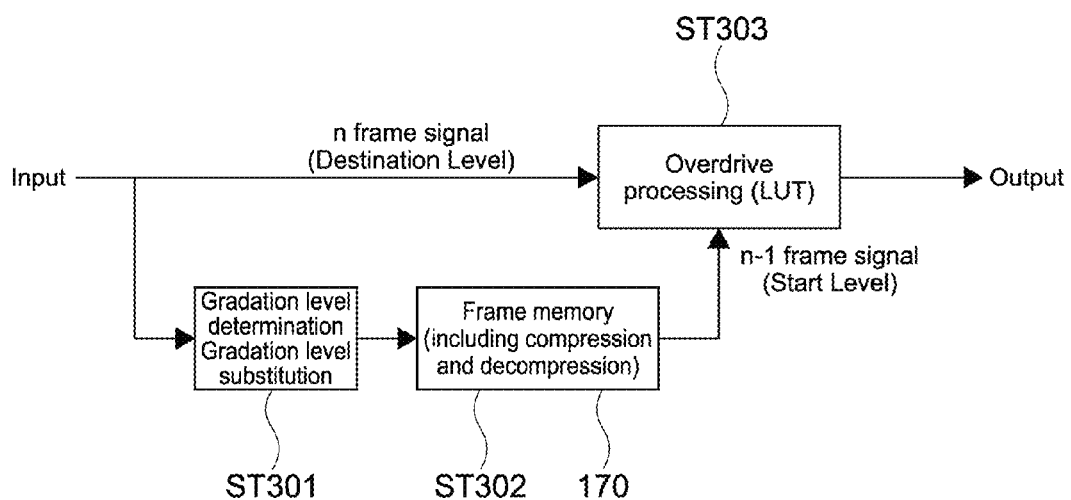
FIG. 8 is a flowchart showing a correction example by the signal processing method executed by the video signal processing unit shown in FIG. 7.

FIG. 8 is a flowchart showing a correction example by the signal processing method 3. A determination by a determination unit 162 is made on the first image signal of the n−1 frame. The generation unit 165 substitutes a gradation level corresponding to a correction-free gradation level with a substitutive gradation level, to generate a substitutive image signal (Step 301).

As to the substitutive gradation levels, for example, the largest gradation level or the smallest gradation level is selected from the gradation levels corresponding to correction-free gradation levels. For example, in the correction example using the LUT shown in FIG. 4, any one of the gradation levels 33 and 223 is selected as a substitutive gradation level. Alternatively, in the correction example using the LUT shown in FIG. 5, any one of the gradation levels 113 and 255 is selected as a substitutive gradation level. In such a manner, the correction-free gradation level, which is a boundary with a gradation level to be corrected, is selected as a substitutive gradation level. This can simplify the processing. It should be noted that other gradation levels may be used as substitutive gradation levels as long as they correspond to the correction-free gradation levels.

The generated substitutive image signal is compressed by coding and stored in a frame memory 170 (Step 302). The correction/output unit 163 decodes the coded substitutive image signal, and based on the decoded substitutive image signal, outputs pixels having substitutive gradation levels, as correction-free pixels. In other words, for the pixel having the substitutive gradation level, such as the gradation level of 33 described above, in the decoded substitutive image signal, such a pixel is considered as a correction-free pixel and then the correction and the output are executed (Step 303).

So, in this correction example, the substitutive gradation levels can be used as flag information. In other words, the pixel having the substitutive gradation level in the substitutive image signal is determined to have the flag of "on", and then the processing can be executed. This allows the correction and the output to be executed at high accuracy without newly increasing the flag information.

Further, in execution of the spatial compression by coding, in the case where many identical gradation levels are continuous, the compression is easy to perform. With an identical compression ratio, the deterioration is less caused. So, in the substitutive image signal generated by substitution of the gradation level, a high compression accuracy can be achieved, and the deterioration involved in coding and decoding can be satisfactorily suppressed. As a result, the accuracy in processing by the correction/output unit 163 can be improved, and a high-quality image can be displayed. In the case where the correction-free gradation level, which is a boundary with a gradation level to be corrected, is used as a substitutive gradation level, the signal processing including the coding and the decoding can be made easy to perform.

Hereinabove, in the signal processing methods according to the embodiment of the present technology, the pixels that need no correction are determined based on the gradation levels of the first frame. Thus, the occurrence of a problem caused when all the pixels are corrected across the board can be suppressed. As a result, a high-quality image can be displayed, and excellent moving image characteristics and the like can be obtained.

(Electronic Apparatus)

Figure 9:
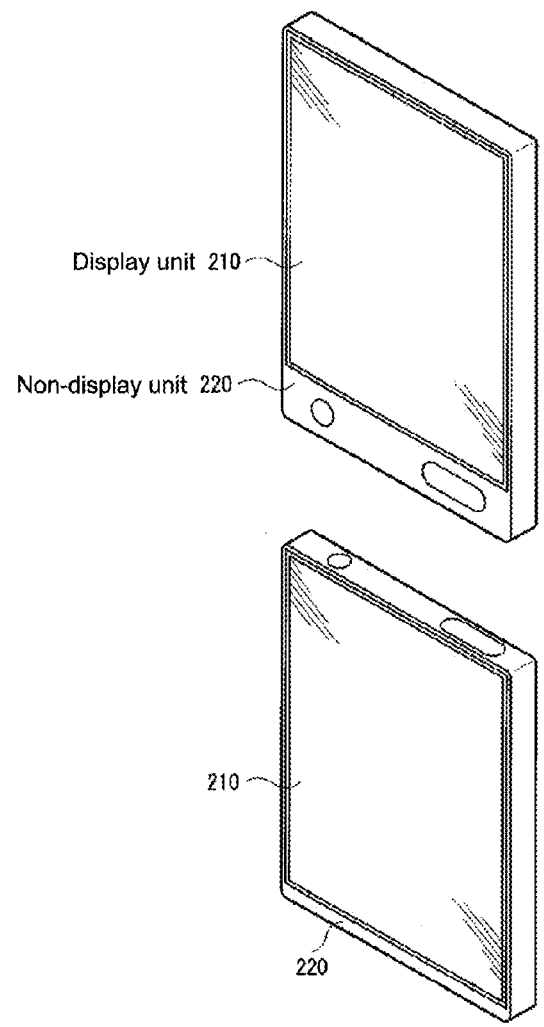
FIG. 9 is a perspective view of the outer appearance of the display device in an application example according to the embodiment of the present technology.

The display device described above can be incorporated, for example as a module, in various electronic apparatuses. For example, the present technology is applicable to a smartphone shown in FIG. 9. This smartphone 200 includes a display unit 210 and a non-display unit 220, for example. The display unit 210 is formed of the display device according to the embodiment described above.

Figure 10:
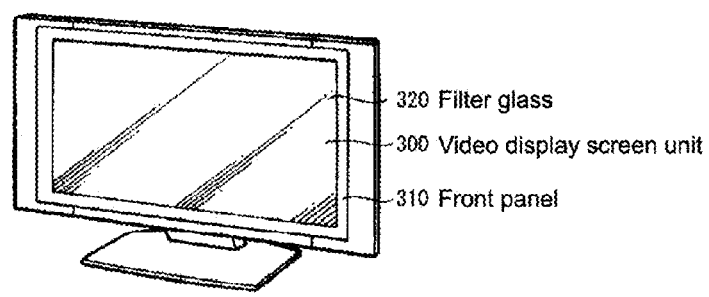
FIG. 10 is a perspective view of the outer appearance of the display device in another application example according to the embodiment of the present technology.

Additionally, the present technology may be applied to a television set as shown in FIG. 10. This television set 300 includes a video display screen unit 300, which includes a front panel 310 and a filter glass 320, for example. The video display screen unit 300 is formed of the display device according to the embodiment described above.

In addition, examples of electronic apparatuses to which the present technology is applicable include digital cameras, laptop personal computers, portable devices such as mobile phones, and video cameras. In other words, the display device described above can be applied to electronic apparatuses in all fields, which display video signals input from the outside or generated therein as images or videos.

Other Embodiments

The present technology is not limited to the embodiments described above, and any other various embodiments can be achieved.

As the signal processing method according to an embodiment of the present technology, the following method may be executed. Specifically, in the method, a first gradation signal and a second gradation signal are input. The first gradation signal indicates a gradation level of a predetermined pixel of a first frame. The second gradation signal indicates a gradation level of the predetermined pixel of a second frame that is continuous from the first frame.

When the input first gradation signal belongs to one of a high gradation level and a low gradation level, the input second gradation signal is set as a correction target. On the other hand, when the input first gradation signal belongs to a gradation level between the high gradation level and the low gradation level, the input second gradation signal is excluded from the correction target.

The range of the high gradation level and the range of the low gradation level may be set as appropriate. A middle gradation level between the high gradation level and the low gradation level is set as a gradation level that needs no correction.

Further, when the input first gradation signal belongs to a middle gradation level, the input second gradation signal may be excluded from the correction target. For example, a START LEVEL such as 128 shown in FIG. 4 and the like is set as a middle gradation level. In such a manner, in the case where a predetermined gradation level is set as the middle gradation level and the first gradation signal corresponds to the middle gradation level, a setting for needing no correction may be made. Also in such a signal processing method, a high-quality image can be displayed.

The image signal (gradation signal) of the first frame to be determined may be a value calculated from signal levels of the first frame and a frame precedent to the first frame. With this value, in a system in which a correction such as overdrive is executed over a plurality of frames, a high-quality image can be displayed using the present technology.

The present technology is also applicable to the case where any of TN (Twisted nematic), VA (Vertical alignment), and IPS (In-plane switching) liquid crystal display panels is used. Additionally, the present technology is also applicable to display devices including light-emitting elements such as organic EL (Electroluminescence) elements and inorganic EL elements.

The effects disclosed herein are merely exemplary ones and are not restrictive ones, and any other effects may be produced. The description on the plurality of effects described above does not necessarily mean that those effects are exerted at the same time, but means that at least any of the effects described above is obtained depending on conditions and the like. As a matter of course, effects that are not described herein may also be exerted.

Of the features of the embodiment described above, at least two of the features can be combined. In other words, various features in the embodiment described on the respective signal processing methods may be optionally combined.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing method, comprising:
    inputting a first image signal and a second image signal, the first image signal containing gradation levels of respective pixels of a first frame, the second image signal containing gradation levels of respective pixels of a second frame that is continuous from the first frame;
    storing at least one predetermined gradation level as a correction-free gradation level that needs no correction;
    determining whether or not the gradation level of the first frame for every pixel is the stored correction-free gradation level, based on the input first image signal;
    outputting a gradation level in the input second image signal by using, as a correction-free pixel that needs no correction, a pixel for which the gradation level of the first frame is determined as the correction-free gradation level;
    generating a substitutive image signal by substituting the gradation level determined as the correction-free gradation level in the gradation levels of the pixels in the first image signal, with a substitutive gradation level that is a predetermined gradation level corresponding to the correction-free gradation level;
    coding and storing the generated substitutive image signal; and
    decoding the coded and stored substitutive image signal, wherein
        the outputting is performed using a pixel having the substitutive gradation level as the correction-free pixel, based on the decoded substitutive image signal.

2. The signal processing method according to claim 1, further comprising:
    coding and storing the input first image signal; and
    decoding the coded and stored first image signal, wherein
    the determining is performed based on the decoded first image signal.

3. The signal processing method according to claim 1, further comprising
    storing a flag corresponding to a determination result on each pixel by the determining, wherein
    the outputting is performed based on the stored flag on each pixel.

4. The signal processing method according to claim 1, wherein
    the substitutive gradation level is one of the largest gradation level and the smallest gradation level in the gradation levels each corresponding to the correction-free gradation level.

* * * * *